(12) United States Patent
Cerciello et al.

(10) Patent No.: US 11,498,323 B2
(45) Date of Patent: Nov. 15, 2022

(54) METHOD FOR PRODUCING A MULTILAYER FILM

(71) Applicant: NORDMECCANICA S.P.A., Piacenza (IT)

(72) Inventors: Vincenzo Cerciello, Piacenza (IT); Stefano Farina, Piacenza (IT)

(73) Assignee: NORDMECCANICA S.P.A., Piacenza (IT)

( * ) Notice: Subject to any disclaimer, the term of this patent is extended or adjusted under 35 U.S.C. 154(b) by 229 days.

(21) Appl. No.: 16/300,316

(22) PCT Filed: Dec. 5, 2016

(86) PCT No.: PCT/IB2016/057358
§ 371 (c)(1),
(2) Date: Nov. 9, 2018

(87) PCT Pub. No.: WO2017/195012
PCT Pub. Date: Nov. 16, 2017

(65) Prior Publication Data
US 2019/0143662 A1 May 16, 2019

(30) Foreign Application Priority Data
May 10, 2016 (IT) .......................... 102016000047986

(51) Int. Cl.
*B32B 37/12* (2006.01)
*B05C 1/12* (2006.01)
(Continued)

(52) U.S. Cl.
CPC ........ *B32B 37/1284* (2013.01); *B05C 1/0834* (2013.01); *B32B 5/022* (2013.01);
(Continued)

(58) Field of Classification Search
CPC .... B32B 37/20; B32B 2037/1269; C09J 5/04; B05C 1/0834
See application file for complete search history.

(56) References Cited

U.S. PATENT DOCUMENTS 4,184,005 A * 1/1980 Bauriedel ............... C09J 5/04
156/310
4,342,613 A * 8/1982 O'Leary ............... B29C 43/305
156/310
(Continued)

FOREIGN PATENT DOCUMENTS

EP 0 324 892 7/1989
EP 1 647 587 A1 4/2006
(Continued)

OTHER PUBLICATIONS

International Search Report, PCT/IB2016/057358, dated Mar. 30, 2017.
Written Opinion, PCT/IB2016/057358, dated Mar. 30, 2017.

*Primary Examiner* — Scott W Dodds
(74) *Attorney, Agent, or Firm* — Nixon & Vanderhye

(57) ABSTRACT

A method for producing a multilayer film including at least two layers joined by a two-component adhesive includes the following steps: spreading a first component A of a two-component adhesive on a first face of a first layer of film; spreading a second component B of the two-component adhesive on a first face of a second layer of film; bringing the first and second faces of the first and second layers into mutual contact joining the components and to form an adhesive and join the two layers in a multilayer film; and winding the multilayer film obtained.

15 Claims, 6 Drawing Sheets

(51) Int. Cl.
  *B32B 7/12* (2006.01)
  *B32B 37/00* (2006.01)
  *B32B 37/02* (2006.01)
  *B32B 5/26* (2006.01)
  *B32B 5/02* (2006.01)
  *B32B 15/04* (2006.01)
  *B32B 15/14* (2006.01)
  *B32B 29/00* (2006.01)
  *B32B 27/08* (2006.01)
  *B32B 27/12* (2006.01)
  *B32B 29/02* (2006.01)
  *B32B 27/06* (2006.01)
  *B32B 15/12* (2006.01)
  *B32B 15/08* (2006.01)
  *B32B 27/10* (2006.01)
  *B05C 1/08* (2006.01)
  *B32B 38/00* (2006.01)
  *B32B 37/20* (2006.01)
  *C09J 5/04* (2006.01)

(52) U.S. Cl.
  CPC ............... *B32B 5/024* (2013.01); *B32B 5/26* (2013.01); *B32B 7/12* (2013.01); *B32B 15/04* (2013.01); *B32B 15/043* (2013.01); *B32B 15/08* (2013.01); *B32B 15/12* (2013.01); *B32B 15/14* (2013.01); *B32B 27/06* (2013.01); *B32B 27/08* (2013.01); *B32B 27/10* (2013.01); *B32B 27/12* (2013.01); *B32B 29/002* (2013.01); *B32B 29/005* (2013.01); *B32B 29/02* (2013.01); *B32B 37/0053* (2013.01); *B32B 37/02* (2013.01); *B32B 37/20* (2013.01); *B32B 37/203* (2013.01); *B32B 38/145* (2013.01); *B32B 2037/1269* (2013.01); *B32B 2255/10* (2013.01); *B32B 2255/205* (2013.01); *B32B 2439/70* (2013.01); *C09J 5/04* (2013.01)

(56) References Cited

U.S. PATENT DOCUMENTS

| | | | | |
|---|---|---|---|---|
| 5,458,926 | A | * | 10/1995 | VerMehren ............ B05C 1/165 118/244 |
| 2001/0027747 | A1 | * | 10/2001 | Quetti .................. B05C 1/0865 118/244 |
| 2006/0078741 | A1 | * | 4/2006 | Ramalingam ........ C08G 18/246 156/331.7 |
| 2010/0136347 | A1 | | 6/2010 | Simons et al. |
| 2015/0020949 | A1 | * | 1/2015 | Howard ................. B32B 37/12 156/73.1 |

FOREIGN PATENT DOCUMENTS

| | | |
|---|---|---|
| EP | 2 085 218 | 8/2009 |
| JP | 2009-275160 | 11/2009 |
| WO | WO 00/71343 | 11/2000 |

* cited by examiner

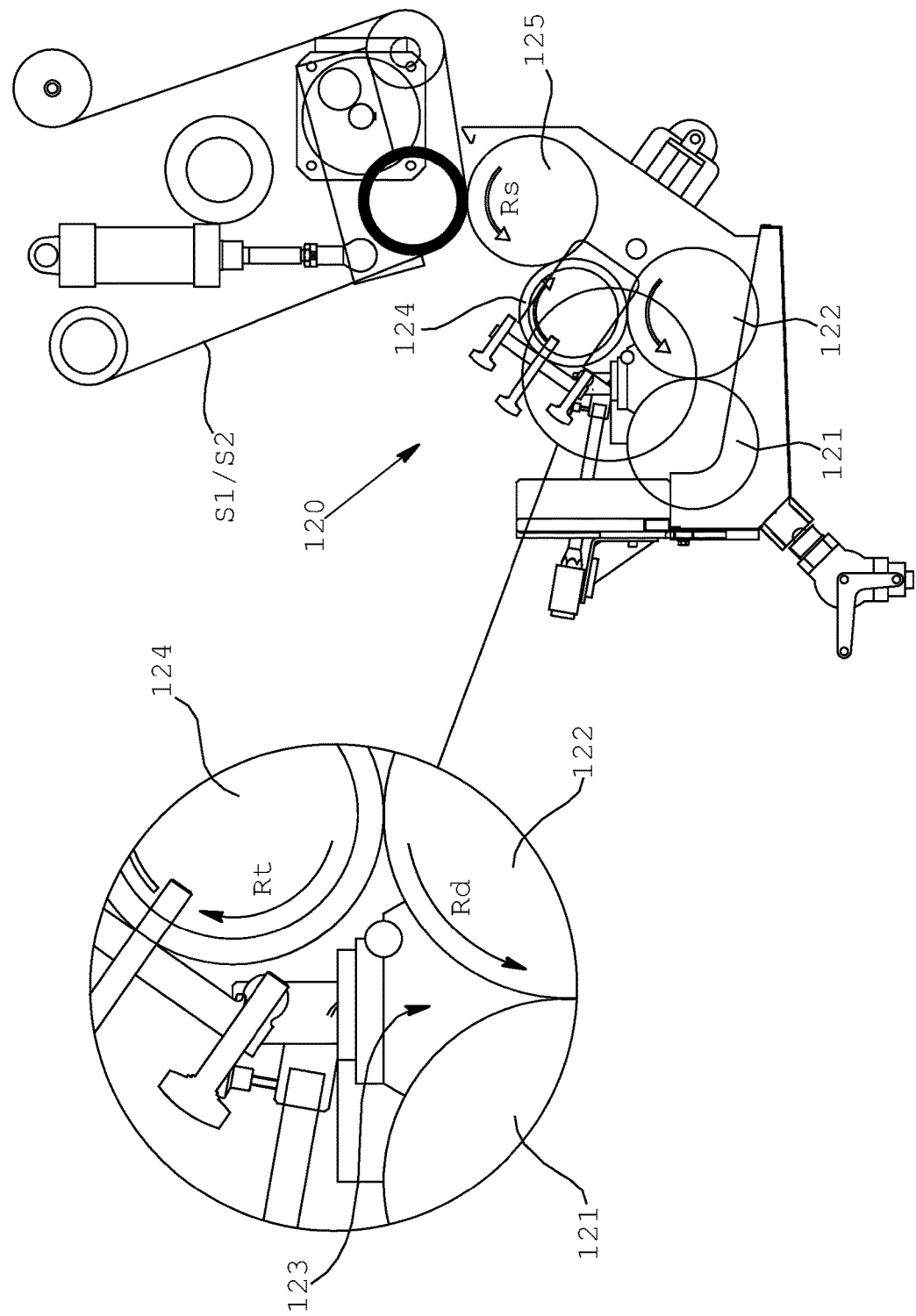

METHOD FOR PRODUCING A MULTILAYER FILM

BACKGROUND OF THE INVENTION

Field of the Invention

The present invention relates to a method and an apparatus for producing multilayer films.

More in detail, the invention relates to a method and an apparatus for producing a coupled multilayer film in which at least two layers are mutually joined by means of a solventless adhesive.

Description of the Related Art

The invention also concerns a multilayer film produced with the aforesaid method.

In various sectors of industry, especially the packaging industry, films consisting of several layers, also of different materials, mutually coupled by means of co-extrusion or gluing, are used.

Among the various types of adhesives available, solventless adhesives are those most widely used in this sector, especially for packaging intended for the food industry.

Methods and machinery for coupling several layers of film with solventless adhesives are known, for example, from the patents EP 0324892 B2 and EP 2085218 B1, by the same applicant.

According to these known methods, to join two layers of film, a solventless two-component adhesive is deposited on one face of one of the two layers and, subsequently, the two layers are brought into contact to create a laminated multilayer film.

These processes use a solventless two-component adhesive, the two components of which, typically resin and hardener, are mixed before being applied to the layer of film and, more precisely, before being conveyed to the coupling machine.

Mixing of the two components gives rise to a chemical cross-linking reaction, which gradually increases the viscosity of the adhesive until it solidifies completely. Simultaneously, the adhesive increases its bonding strength that allows the two layers of film to be firmly joined.

Therefore, after mixing, application of the adhesive to the film must take place within a limited time interval in which its viscosity is such as to allow it to be deposited in a uniform layer with a thickness of a few microns.

The time limit within which the mixed adhesive is "spreadable" on the film is called "pot life".

Beyond this time limit, the adhesive, which is no longer re-usable, must be removed quickly and completely from the parts of the machinery with which it is in contact to prevent damaging them.

However, the cleaning operations of these parts are particularly onerous both in terms of cost, due to the need to use chemical products (solvents, etc.), and from the viewpoint of organizing work, due to the urgency with which these operations must be carried out, i.e. before complete hardening of the adhesive.

For these reasons, the composition of solventless adhesives currently used is studied to ensure a compromise between "pot life" that is not too short, for example to allow the production process to be interrupted for several tens of minutes without having to resort to machine downtime and cleaning of the parts in contact with the adhesive, and an initial bonding strength, also called "green bond strength", sufficient to obtain a laminated multilayer film with a suitable optical quality.

However, at the end of the coupling process with the adhesives currently used, the multilayer film must be stored to rest for a period variable from several tens of hours (even up to 70 hours) to allow completion of the hardening process, before carrying out subsequent operations, such as cutting or printing.

BRIEF SUMMARY OF THE INVENTION

In this context, the object of the present invention is to provide a method and an apparatus for producing a laminated multilayer film that overcomes the problems of the prior art described above.

It is therefore an object of the present invention to propose a method for producing a multilayer film that allows elimination of the aforesaid problems caused by pot life of known solventless adhesives.

Another object of the present invention is to provide a method for producing a multilayer film that allows elimination or limitation of the machine downtimes required to carry out cleaning of the operating parts in contact with the adhesive.

A further object of the present invention is to provide a method for producing a multilayer film that is more efficient from the viewpoint of cost and the environment, due to the reduction in waste of adhesive.

Yet another object of the present invention is to provide a method for producing a multilayer film that allows a substantial reduction in the rest time required after coupling of the layers, and therefore of the related costs linked to storage.

In addition to the aforesaid objects, an object of the present invention is to provide a method for producing a multilayer film with improved optical qualities with respect to films produced with prior art methods.

These and other objects are achieved by a method for producing a multilayer film in flexible material in which at least two layers of film, made of the same material or of different materials, are joined by means of a solventless two-component adhesive. The aforesaid adhesive shows good bonding strength, as well as good chemical and thermal strength.

According to the invention, the two main components, i.e. a component A and a component B, are spread separately as is, each on a respective face of the layers to be coupled, instead of being pre-mixed before being spread on the faces of the layers to be coupled. The layers can be two or more. The aforesaid components A and B that form the adhesive composition employed in the method according to the present invention, once placed in mutual contact, have the advantage of reacting with each other very quickly. Following the high mutual reactivity of said components A and B, the adhesive composition employed is formulated so that the two components A and B are applied separately on two different sublayers, i.e. the layers of film to be coupled, instead of being premixed and applied on a face of only one of the two layers to be coupled.

The multilayer film is obtained by bringing the two components A and B into contact, which triggers an immediate and particularly quick reaction that leads to the formation of bonds with a strength that allows practically instant joining of the two layers of film.

This rapidity of reaction allows, after coupling of the two layers, the multilayer film obtained to be wound directly onto a take-up reel. Moreover, by doing this, the optical quality of the coupled multilayer film is not in any way affected.

In practice, in accordance with the invention, the method does not require the implementation of further mixing steps of the two components A and B between the two layers of film of the adhesive obtained from these, to activate or increase the reaction process.

On the contrary, contact between the two components spread on the respective layers is sufficient to complete their adhesion.

The multilayer film thus obtained requires a much lower rest time with respect to prior art methods (several tens of minutes and in any case within two hours) before it can be cut or used for subsequent operations, such as printing or coupling to other layers of film.

Optionally, as a function of the materials of the layers of film to be coupled, the method can provide for a further cooling step of the multilayer film before it is wound on a take-up reel.

The method of the present invention thus, in fact, eliminates the aforesaid problems linked to hardening of the pre-mixed adhesive, typical of prior art methods.

In accordance with the invention, the method thus comprises the following steps:

spreading a first component A of a two-component adhesive on a first face of a first layer of film;
spreading a second component B of the two-component adhesive on a first face of a second layer of film;
bringing the aforesaid first and second faces of the first and second layers into mutual contact joining the components A and B to form an adhesive and join the two layers in a multilayer film; and
winding the multilayer film obtained.

In an aspect of the invention, the thickness of the first layer of adhesive and of the second layer of adhesive is preferably from 0.3 micron to 0.8 micron. More preferably, the thickness of the first layer of adhesive and of the second layer of adhesive is from 0.4 micron to 0.6 micron. These values of thickness, extremely low, allow the components of the adhesive to be mixed together by simple contact, when the two layers of film are joined.

Within the context of the present invention, the term "simple contact" means that the two components are mixed together simply by coming into mutual contact, i.e. without the aid of external means adapted to provide energy, for example in the form of heat, ultrasonic waves, electromagnetic radiation or the like, to cause mixing of the components to take place.

This mixing, due to these thicknesses, takes place in a constant and uniform manner on the whole of the surface of the film, ensuring a high optical quality of the multilayer film.

In another aspect of the invention, the second component and the first component have a weight ratio typically and preferably equal to or close to parity for the majority of applications. In fact, a substantially balanced distribution of the two components on the two faces of the layers to be coupled both facilitates mixing by simple contact and, therefore, complete and uniform reaction of the adhesive, and allows application of the components on each face of the layers to be coupled in a quantity that is small but still sufficient to enable it to be controlled to ensure both its presence and uniform thickness.

Preferably, the step of spreading the components A and B of the adhesive is carried out in respective and separate spreading units. Each spreading unit comprises at least a first metering roller and at least a second metering roller, side by side, in which the first metering roller is in contact with a component of the adhesive.

At least one of said rollers, typically the second, is rotated with respect to the other so as to pick up a layer of the component of the adhesive, which is subsequently deposited on a face of the layer of film directly or, more preferably, by means of other rollers. According to a preferred variant, the angular position of the first metering roller is instead maintained fixed during the process.

Regulation of the quantity, and therefore of the thickness, of the layer of the component of the adhesive spread on the layer of film, depends mainly on a gap between the two metering rollers.

For this purpose, according to the invention, at least one of the two metering rollers, preferably the first, is movable with respect to the other by means of a regulation system controlled by a control unit configured to control said regulation system as a function of the geometric and/or dimensional parameters of the first metering roller.

In accordance with an aspect of the invention, the step comprising spreading a component A, B of the adhesive on the face of a layer can comprise the following steps:

arranging at least a first metering roller and a second metering roller, facing each other and spaced by a gap, wherein at least the second metering roller is rotatable with respect to the first and is in contact with a component A, B of the adhesive;
arranging a regulation device to move at least the first metering roller with respect to the second metering roller; and
regulating the gap between the metering rollers, to regulate the thickness of the component of the adhesive spread on the layer of film, as a function of the geometric and/or dimensional parameters of the first metering roller.

As a function of these parameters, the control unit activates the regulation system to move the metering rollers toward or away from each other in order to correctly regulate the gap and, therefore, the amount of the component that will be applied to a face of the layer of film.

In this way, it is possible to correct the position of the first metering roller, with respect to a predetermined nominal position, cancelling or in any case limiting the effect that the geometric and/or dimensional tolerances of the first metering roller would have on the actual value of the aforesaid gap.

In another aspect of the invention, the step comprising regulating the gap between metering rollers can comprise the following sub-steps:

detecting the angular position of the first metering roller;
determining geometric and/or dimensional parameters of an operating zone of the first metering roller as a function of the aforesaid angular position;
activating the regulation system to move the first metering roller toward or away from the second metering roller, as a function of the aforesaid geometric and/or dimensional parameters.

In this way it is possible to use the first metering roller in several angular positions, for example to utilize a clean zone of the surface, or to utilize the whole of its surface in a uniform manner. In particular, it is possible to detect which part of the surface is involved in the spreading process, in particular the zone close to the gap G where the adhesive is laminated on the surface of the second metering roller, and to know the geometric and/or dimensional parameters of that zone.

In another aspect of the invention, the method can comprise the following steps:
- detecting a temperature parameter correlated to the temperature of the metering rollers;
- activating the regulation system to move the first metering roller toward or away from the second metering roller, as a function of said further temperature parameter.

According to another aspect of the invention, there is arranged a further conveyor roller that rotates in contact with the second metering roller.

Again in order to regulate the amount of component of the adhesive spread on the layer of film, the method provides for regulating, preferably continuously, the rotation speed of the second metering roller and of the aforesaid conveyor roller.

In another aspect of the invention, the step of bringing the two layers into contact is preferably implemented by means of a pair of counter-rotating rollers, of which at least one of the two comprises a heatable calendar. The temperature of the calendar is preferably maintained between 57° C. and 63° C. From tests carried out, this temperature range provided the best results in terms of optical quality of the multilayer film obtained.

In another aspect of the invention, the first layer of film is partially wound on the aforesaid calendar before coming into contact with the second layer. The heat transferred from the calendar to the first component A of the adhesive, spread on the first layer of film, facilitates the reaction between the two components A and B when these are joined brought into mutual contact.

Preferably the arc of contact of the first layer on the calendar, before coupling, has an angle from 68° to 78°. The applicant has found that in the aforesaid angular range the amount of heat transferred from the calendar to the first component A of the adhesive allows the best optical quality of the multilayer film to be achieved.

This angular interval is compatible with a linear translation speed of the layers of film from 250 to 450 m/min.

For the same reasons set forth above, according to another aspect of the invention, after the joining point of the two layers, the coupled film is wound on the calendar on an arc of contact from 18° to 23°.

According to another aspect of the invention, at the time of spreading on the first layer of film, the first component A of the adhesive is at a temperature preferably from 45° C. to 50° C. In this temperature range, the viscosity or fluidity of the first component A facilitates the spreading step, making it possible to deposit a layer of very low thickness.

The second component B of the adhesive is instead preferably maintained at room temperature.

According to the invention, the components A and B are selected in such a way as to be very reactive, so as to form a particularly fast-hardening adhesive composition. Preferably, this composition is selected so that within 90 minutes from the joining of the two layers of film, the adhesive has a bonding strength equal to or greater than 1.5 N/15 mm.

The method according to the invention is suitable to produce multilayer films comprising two or more layers of film with material selected, for example, from paper, polymers or metal coated polymers, metal sheets, nonwoven fabric.

According to a preferred embodiment, as already set forth above, there is used a solventless two-component adhesive in the form of a kit composed of two separate components, each of which is spread on a face of the layers to be coupled.

The kit consists of two components formulated separately and kept separate from each other until the time in which, after the components have been spread on the face of the layers to be coupled, coupling takes place. Preferably, both the aforesaid components A and B are, at room temperature, in liquid state or have a fluidity that makes them easy to spread on the face of the layer to be coupled. If a component is solid or has too low a fluidity at said temperature, it is acceptable to heat the solid component until it passes to liquid state or, in any case, reaches a fluidity suitable for spreading.

Said solventless two-component adhesives are, for example, compositions based on epoxy resins or cross-linked polyurethanes. These adhesives are known to those skilled in the art.

In the case of a two-component polyurethane adhesive, the kit is, for example, composed of:
a) a component A comprising at least a functionalized compound with an isocyanate group, and
b) a component B comprising at least a functionalized compound with a group having an active hydrogen.

The functionalized compound with an isocyanate group is selected from aromatic isocyanates, which are preferred, aliphatic isocyanates and a mixture thereof.

The functionalized compound with an isocyanate group is selected from compounds known for preparing adhesive compositions. Examples of this compound are prepolymers of isocyanate, an isocyanate monomer, isocyanate oligomers (e.g., dimers, trimers, etc.), polyisocyanates and mixtures thereof. Hereinafter, the term polyisocyanates is meant also to include isocyanate oligomers.

Isocyanate prepolymers are the reaction product of reagents comprising at least one isocyanate and at least one amino alcohol. Hereinafter, the prepolymer of the isocyanate can itself be a polyisocyanate.

Examples of aliphatic isocyanates suitable to be used in the method of the present invention comprise hexamethylene diisocyanate (HDI) isomers, isophorone diisocyanate (IPDI) isomers and mixtures of two or more thereof.

Examples of aromatic isocyanates suitable for use in the method of the present invention comprise isomers of 4,4'-methylene diphenyl diisocyanate ("MDI"), such as 4,4'-MDI, 2,2'-MDI and 2,4'-MDI, toluene diisocyanate isomers ("TDI"), such as 2,4-TDI and 2,6-TDI, xylene diisocyanate isomers ("XDI"), naphthalene diisocyanate isomers ("NBDI"), tetramethyl xylylene diisocyanate isomers ("TMXDI") and mixtures of two or more of these.

The functionalized compound of the component B can be selected from polyols, in particular aliphatic amino alcohols. In particular, this amino alcohol comprises one or two or more alcohol groups.

Even more in particular, said aliphatic amino alcohol comprises at least two primary alcohol groups and at least one secondary or tertiary amine group.

These solventless two-component adhesive compositions are described in the patent EP 1647587.

In the present description with reference to the isocyanate and to the polyols, functional group is meant as the number of sites reactive with the OH group and with the isocyanate group per molecule, respectively.

For the purposes of the present invention, said functionalized compound with a group having an active hydrogen and said functionalized compound with an isocyanate group are used in an equivalent weight ratio so that the OH groups are preferably equal to or slightly in excess with respect to the isocyanate groups. Therefore, this ratio is from 1.5:1 and 1:1.2, preferably from 1.2:1 to 1:1.1, more preferably 1:1.

The aforesaid components A and B and/or the adhesive can also comprise other components, such as catalysts. These latter have the purpose of increasing the reaction speed between the components A and B. The catalysts can be free or micro-encapsulated. Examples of catalyst are tertiary amines, such as triethyl amine.

The component B can also comprise different polyols to the aforementioned compounds. Examples of these additional polyols are polyester polyols, polyether polyols, polycarbonate polyols, polyacrylate polyols, polycaprolactone polyols, polyolefin polyols, polyols of natural oils and combinations thereof.

Finally, the aforesaid components and/or said adhesive can also comprise one or more additives or other useful compounds. Examples of these additives and substances are plasticizers, tackifiers, rheology modifiers, antioxidants, colouring agents, surfactants, etc.

As the pot life of the adhesive composition is separate from the reaction process between the two components, the components can be stored indefinitely.

BRIEF DESCRIPTION OF THE DRAWINGS

Further characteristics and advantages of the present invention will become more apparent from the description of an example of a preferred, but not exclusive, embodiment of an apparatus for producing a multilayer film, as illustrated in the accompanying drawings, wherein:

FIG. 2 is a schematic lateral view of a spreading unit of the apparatus of FIG. 1;

DETAILED DESCRIPTION OF THE PREFERRED EMBODIMENTS

Figure 1:
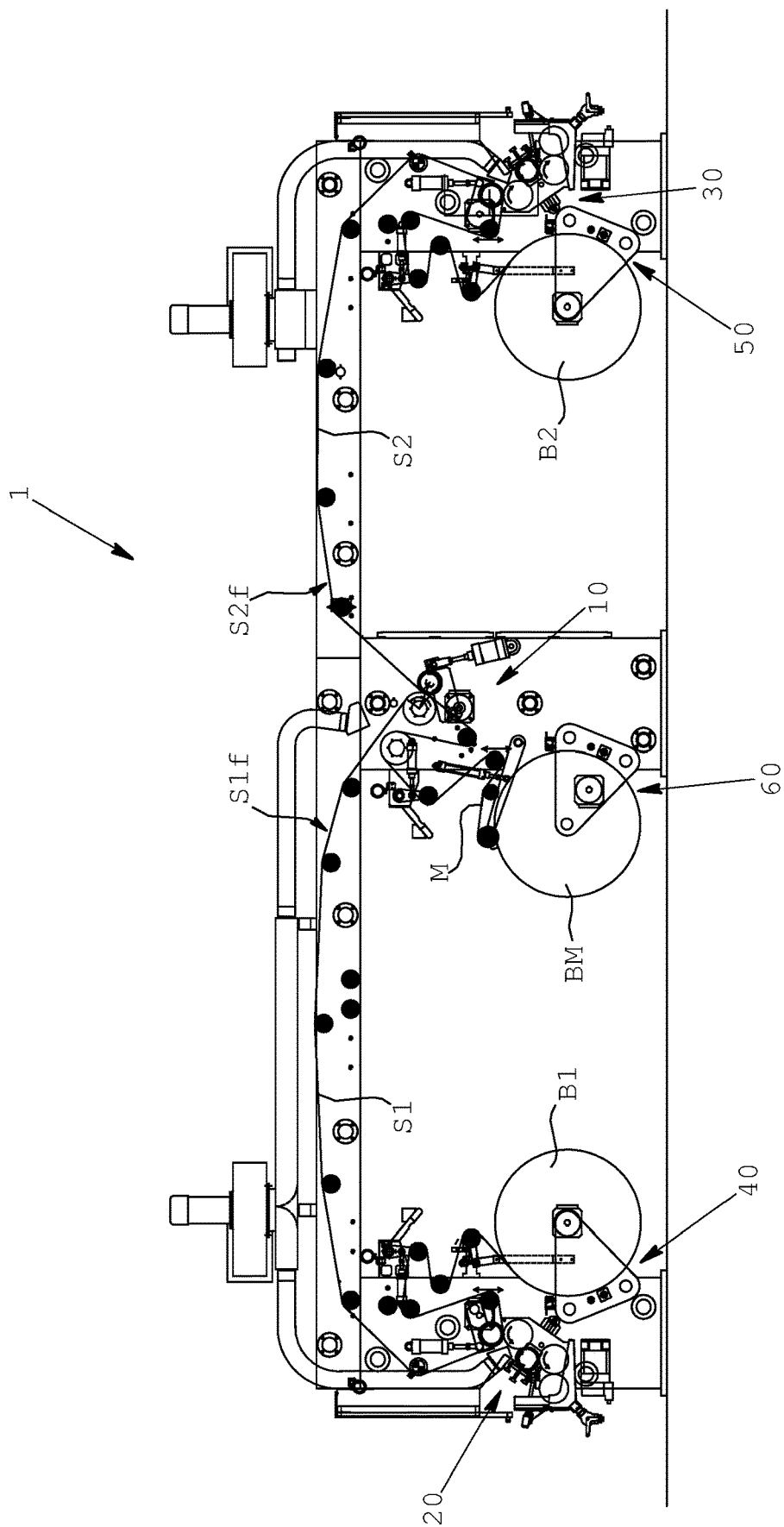
FIG. 1 is a schematic lateral view of an apparatus for producing a multilayer film in accordance with the present invention.

With reference to the accompanying FIG. 1, the number 1 indicates as a whole an apparatus for producing a laminated multilayer film.

The apparatus 1 comprises at least a coupling unit 10, a first spreading unit 20 and a second spreading unit 30. Said first and second spreading unit 20, 30 are configured to each spread a component of an adhesive respectively on a first layer of film S1 and on a second layer of film S2.

The two layers of film S1 and S2, are subsequently guided by a plurality of rollers toward the coupling unit in which they are made to adhere to each other to create a coupled multilayer film M.

The first and the second layer of film S1, S2 are unwound from two reels B1, B2 supported and rotated by a first unwinder 40 and by a second unwinder 50 that respectively serve the first spreading unit 20 and the second spreading unit 30.

The multilayer film M is instead wound on a reel BM by a winder 60.

FIG. 2 illustrates in more detail a spreading unit of the apparatus 1. The spreading units 20, 30 are substantially identical; the description below must therefore be understood to refer to both the aforesaid units.

The spreading unit, indicated as a whole with 120, comprises a first metering roller 121 and a second metering roller 122, arranged facing the first. The first metering roller 121 is preferably maintained blocked in rotation during operation of the apparatus. The second metering roller 122 is instead rotated with respect to the first in a direction of rotation indicated by the arrow Rd. The outer surface of the metering rollers 121, 122 is preferably smooth and coated, or made of chromed steel.

In the space between the two metering rollers 121, 122 there is defined a chamber 123 into which there can be transferred a component of a two-component adhesive, typically in fluid form, in contact with the outer surfaces of both rollers. To maintain the viscosity of the components of the adhesive at a desired value, the metering rollers are preferably provided with heating means to heat the outer surface.

The surfaces of the two metering rollers 121, 122 are spaced by a gap of a few hundredths of millimetre so that, following rotation of the second metering roller with respect to the first, the adhesive is laminated through the gap and a thin and uniform layer remains adhering to the surface of the second metering roller 122.

This layer of adhesive, by means of one or more rollers that rotate in contact with the second metering roller 122, is transferred to a moving film S1, S2.

In the variant illustrated, the spreading device comprises a further conveyor roller 124 that rotates in contact with the second metering roller 122 in an opposite direction of rotation Rt. The conveyor roller 124 is preferably coated with a layer of vulcanized rubber. The task of the conveyor roller 124 is to pick up the layer of adhesive from the second metering roller 122 and transfer it to a spreading roller 125 that rotates in contact therewith in an opposite direction of rotation Rs.

The spreading roller 125 is, in turn, placed in contact with the layer of moving film S1, S2, on which the adhesive is spread in a continuous and uniform +layer.

Advantageously, the rotation speed of the spreading roller 125 is greater with respect to that of the conveyor roller 124 which, in turn, is greater with respect to that of the second metering roller 122.

This increase in speed allows a gradual decrease in the thickness of the layer of adhesive deposited on the surface of the rollers and, subsequently, on the layer of film.

The gap, i.e. the minimum distance between surfaces of the metering rollers 121, 122, can be regulated by means of a regulation system so as to vary the thickness of the layer of adhesive picked up by the second metering roller 122 and, consequently, the thickness of the layer of adhesive applied to the film S1, S2.

FIGS. 3a to 3d illustrate a detail of the spreading device in which the aforesaid regulation system, indicated as a whole with 130, is visible. In accordance with a preferred variant of the invention, said regulation system acts on the first metering roller 121 moving it with respect to the second metering roller 11 whose axis of rotation is fixed.

The first metering roller 121 comprises an operating central portion 121a comprised between two support shafts 121b (FIG. 3d), by means of which the metering roller is supported by the frame of the spreading device (not illustrated in the figure).

Each support shaft 121b is coupled with an eccentric support 131 comprising a fixed portion 131a, integral with the frame of the device, and moving portion 131b, connected to the fixed portion and rotatable with respect to it about an axis of rotation Xe. Said fixed and moving portions are preferably in the form of concentric rings. More in detail, the moving portion 131b, inner ring, is housed in the fixed portion 131a, outer ring.

Figure 4:
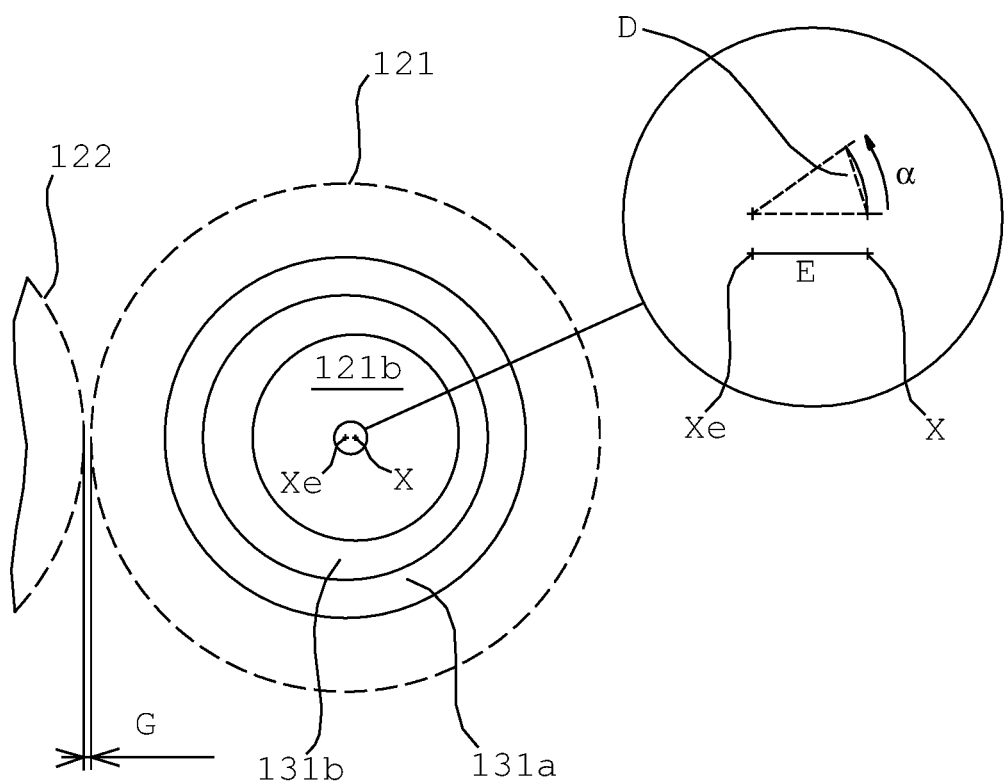
FIG. 4 is a schematized representation of a part of the regulation device of FIG. 2.

The support shaft 121b is, in turn, housed rotatingly in a seat produced in the moving portion 131a so that its axis of rotation X is decentred with respect to the axis of rotation Xe of the moving portion. FIG. 4 represents, schematically and in section, the fixed portion 131a, the moving portion 131b and support shaft 121b. In the figure, the letter E indicates the eccentricity between the axis X of the first metering roller 121 and the axis of rotation Xe of the moving portion 131b, which, to make the drawing clearer, is intentionally out of proportion. In actual fact, the value of the eccentricity E is preferably from 0.2 mm to 1 mm.

By observing FIG. 4, the operation of the regulation device 130 can be better understood. When the moving portion 131b is rotated about the axis Xe by an angle α, the axis X of the first metering roller 121 performs a rotation along a circumference with a radius E moving, with respect to an initial position, by a length D. This movement causes the surface of the first metering roller 121 to move toward or away from the surface of the second metering roller 122 and, therefore, increase or decrease of the gap G.

Figure 3A:
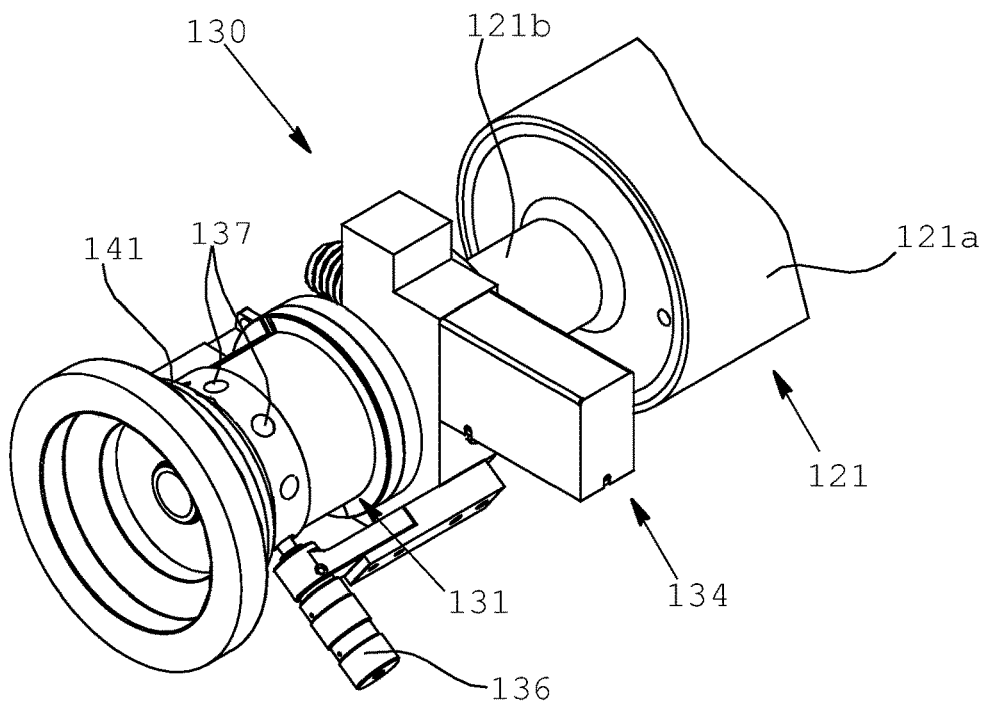
FIGS. 3a and 3b are two perspective views of the regulation device of the position of the metering roller in the spreading unit of FIG. 2.
Figure 3B:
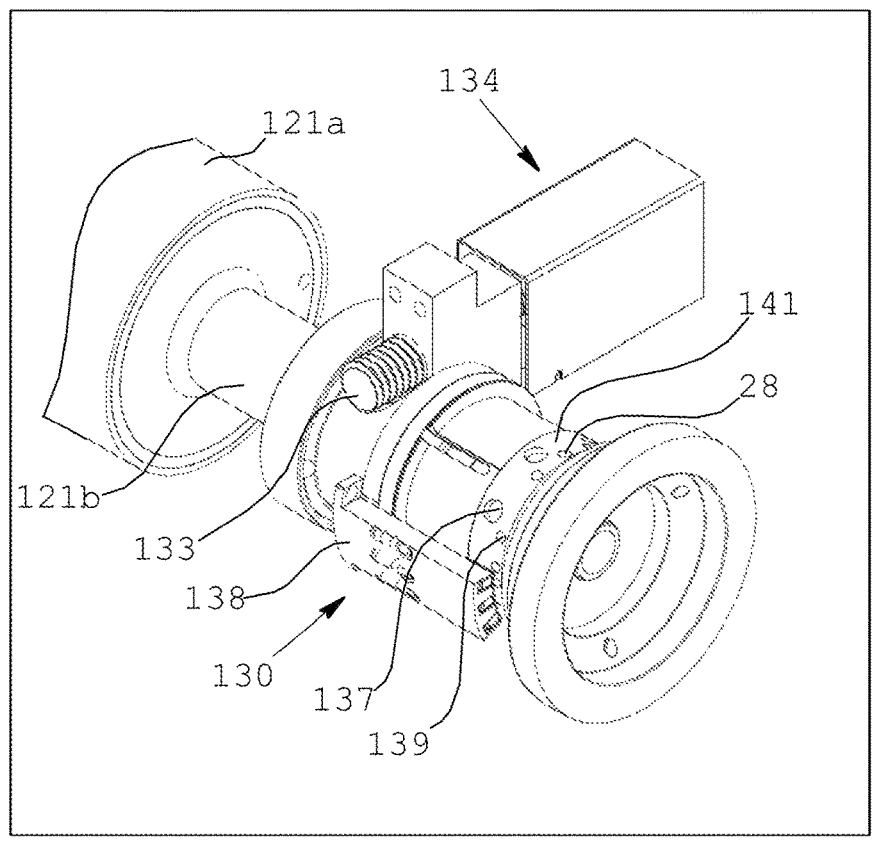
Figure 3C:
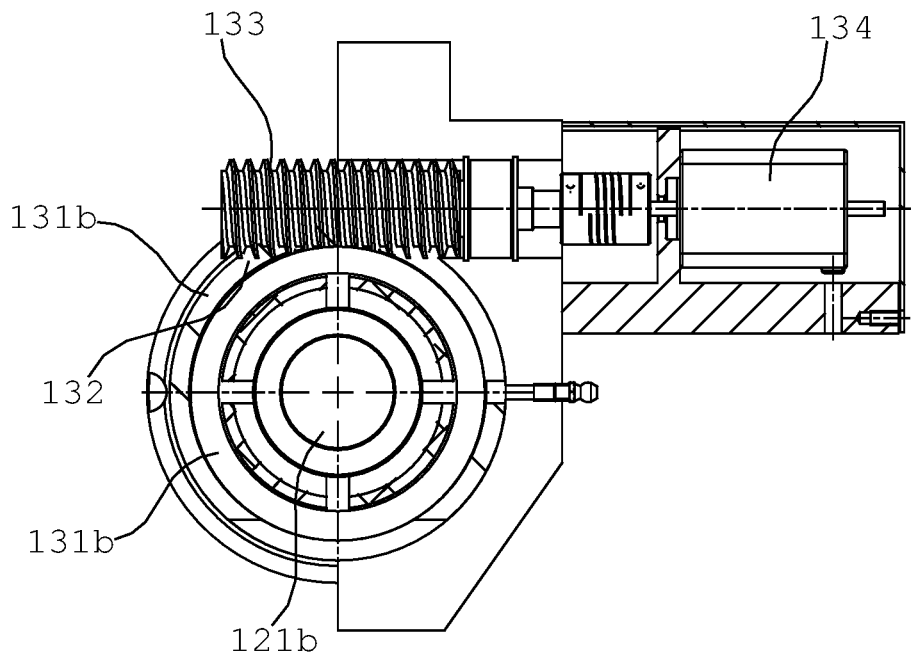
FIG. 3c is a sectional view along a plane perpendicular to the axis of the metering roller.
Figure 3D:
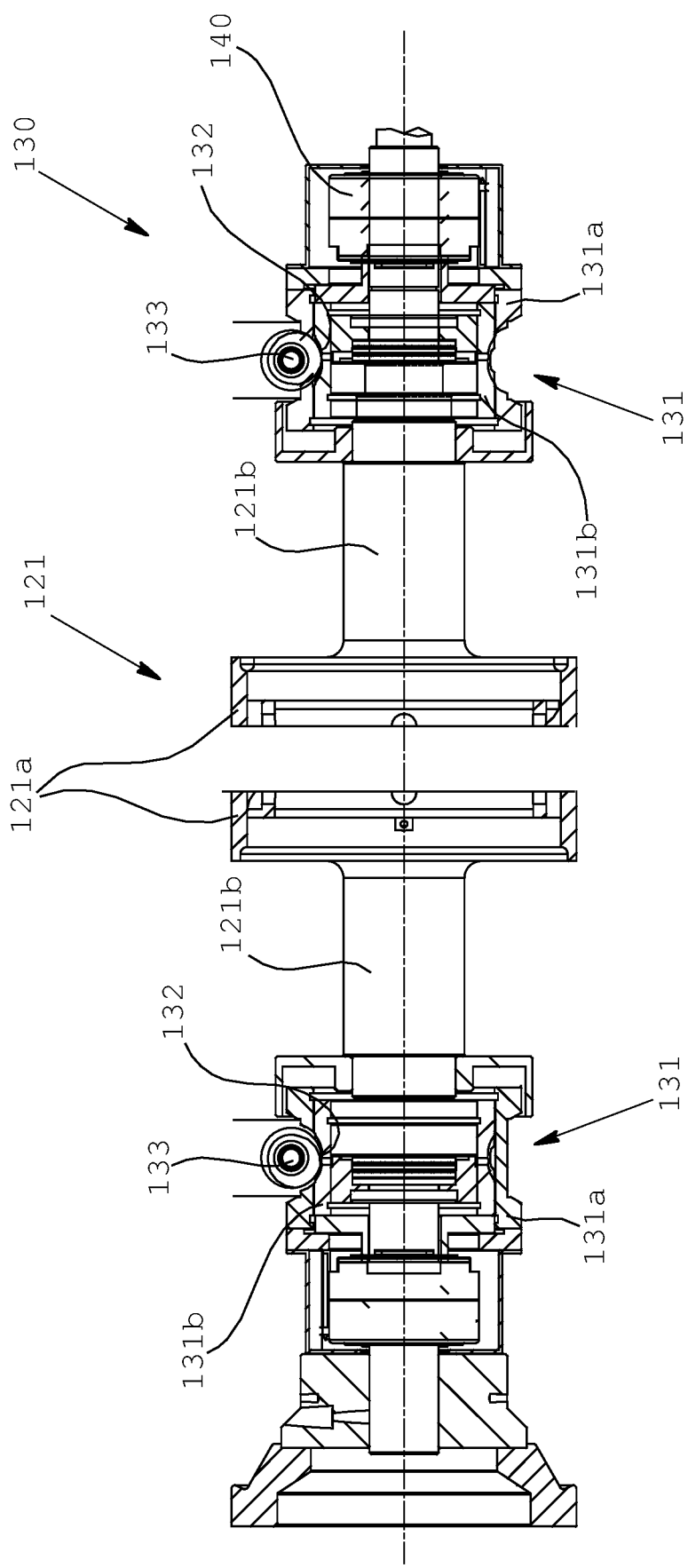
FIG. 3d is a sectional view along a plane passing through the axis of the metering roller.

On the outer surface of the moving portion 131b there are produced teeth 132, preferably with a helical profile, meshed on which is a worm screw 133 (FIGS. 3c, 3d).

Rotation of the worm screw 133, in one or in the other direction, causes rotation of the moving portion 131b and therefore, as described above, an increase or decrease of the gap G.

The screw 133 is moved by a motor 134, optionally associated with an encoder 140.

A regulation system of this type allows variations of the gap G to be obtained with a precision up to one micron where the extension of the gap is typically from 50 to 80 micron.

According to the invention, the regulation system is controlled by a control unit (not illustrated in the figure) configured to correct the position of the first metering roller 121 with respect to the second metering roller 122, as a function of the geometric and/or dimensional parameters of the surface of the first metering roller. In fact, as said first metering roller 121 is maintained in a fixed angular position during the spreading process, any defects (geometric and/or dimensional tolerances) cannot be averaged as instead occurs for the second metering roller 122.

For this purpose, according to a preferred aspect of the invention, the control unit is connected to a device for detecting the angular position of the first metering roller 121. By means of this device, the control unit detects which part of the surface of the first metering roller 121 is involved in the spreading process, and in particular the zone close to the gap G where the adhesive is laminated on the surface of the second metering roller 122.

In fact, this operating part is not always the same, but, on the contrary, the first metering roller 121 is used in different angular positions, at times even in the same production batch, for example to utilize a new clean zone or, in any case, to utilize its surface in a uniform manner.

Advantageously, the control unit can be connected to, or can contain, a database in which the aforesaid geometric and/or dimensional parameters of the first metering roller 121 such as eccentricity, cylindricity, rectilinearity, etc., are stored.

These parameters can be detected in advance by means of measurement instruments and stored in the aforesaid database.

As a function of the aforesaid parameters, the control unit can control, in a coordinated manner, operation of the motors 134 of the two eccentric supports 131 to arrange the first metering roller 121 so that the value of the gap G corresponds as closely as possible to the nominal process value constant along the length of the operating part of the metering rollers.

In this way, the regulation device 130 is able to compensate the operating tolerances of the metering rollers, maintaining constant and correct the amounts and hence the thickness of the adhesive picked up by the second metering roller.

In a preferred variant, said system for detecting the angular position of the first metering roller comprises one or more sensors 138, integral with the frame of the device, adapted to detect references 139 produced on the first metering roller 121 or on a part integral therewith.

In the variant illustrated, the sensor 138 comprises an optical sensor configured to detect the position of a plurality of holes 139 produced on a hub 141 integral with the first metering roller 121. Alternatively, the sensor 138 can comprise an inductive, capacitive or magnetic sensor, or other position sensors with or without contact.

As mentioned above, the first metering roller 121 can be arranged in different angular positions, which are then maintained while the spreading device is operating. According to a preferred variant, these positions are defined by a plurality of seats 137 produced on the hub 141. A positioning mechanism 136 can engage said seats 137 to maintain, during the process, a given selected angular position.

According to a preferred aspect of the invention, the control unit can be connected to sensors adapted to detect a parameter correlated with the temperature of the surface of one or of both the metering rollers 121, 122.

This parameter can comprise, for example, the temperature of a fluid by means of which the surface of the metering rollers is heated.

The control unit, processing the aforesaid temperature values, is able to calculate the thermal expansions of the rollers and, also as a function of the viscosity of the adhesive used, can correct the position of the metering rollers to restore the ideal value of the gap G.

In order to regulate the thickness of the layer of adhesive deposited on the film S1, S2, the control unit can be configured to control the motor means that rotate the second metering roller 122 and the conveyor roller 124 and, in particular, to continuously regulate the rotation speed as a function of the translation speed of the film S and optionally of the temperature parameter of the metering rollers.

Figure 5:
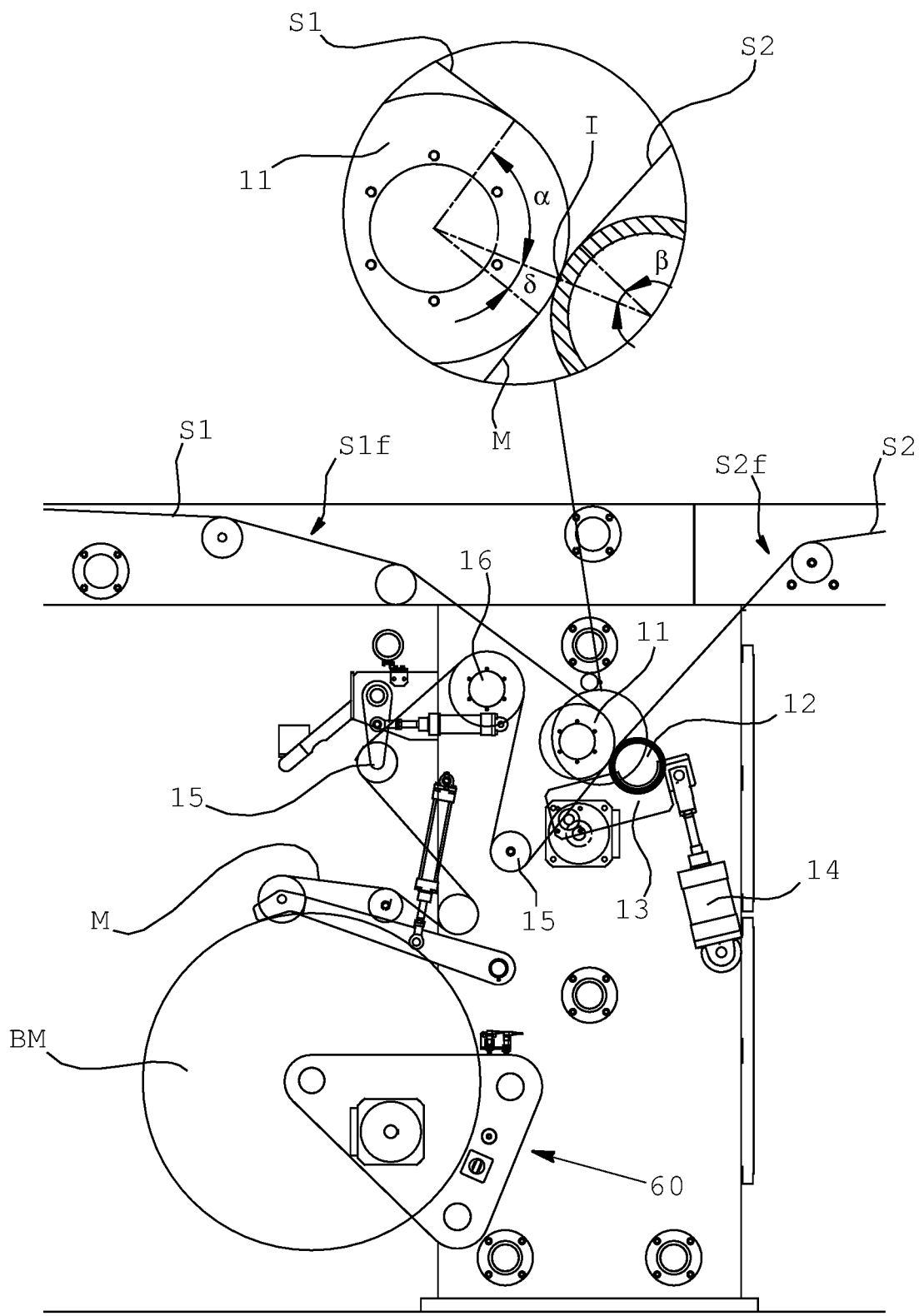
FIG. 5 is a schematic lateral view of the coupling unit of the apparatus of FIG. 1.

FIG. 5 represents the coupling unit 10 of the apparatus. In the coupling unit 10, the first layer of film S1, on the face S1f of which the component A of the adhesive is spread, and the second layer of film S2, on the face S2f of which the second component B of the adhesive is spread, converge.

According to a preferred variant, the coupling unit 10 comprises a heated calendar 11 and an opposing roller 12, preferably rubber coated, that rotates in contact with the calendar 11.

The presser roller 12 is mounted on a moving support 13 that, by means of actuators 14, can be rotated around a pivot point Ps to move the presser roller 12 away from the calendar 11 or to regulate the contact pressure.

Between the calendar 11 and the presser roller 12 there is defined a gluing point I, in which the two faces S1f and S2f come into contact to start the chemical reaction of the two components A and B of the adhesive.

The contact pressure exerted by the presser roller is sufficient to mix the two components A and B of the adhesive so that, after the gluing point, the two layers of film S1, S2 are joined and in a multilayer film M.

According to a preferred variant, the first layer of film S1 is partially wound around the surface of the calendar 11 before the contact point I, while the second layer of film S2 is partially wound on the outer surface of the presser roller 12.

According to a preferred variant, the calendar 11 is heatable with the aid of a fluid that circulates under the outer surface, for example in a network of coiled pipes.

The heat released from the calendar 11 can be transferred to the first component A of the adhesive on the first layer of film S1 to improve the efficiency of the cross-linking process.

For this purpose, the first layer of film S1 is conveyed toward the gluing point I so that the winding angle $\alpha$ on the calendar 11 is preferably from 68° to 78° and more preferably from 71° to 75°. An ideal angle is of around 73°.

The second layer of film S2 is instead conveyed toward the gluing point I so that the winding angle $\beta$ on the presser roller is preferably from 18° to 26° and more preferably from 20° to 24°. An ideal angle is of around 22°.

Again to improve the cross-linking process of the adhesive, after the gluing point I, the coupled multilayer film M is preferably maintained in contact with the calendar 11 for an arc of contact of $\delta$ from 18° to 23°.

A plurality of guide rollers 15 convey the coupled film M from the gluing point I toward the winder 60 in which it is wound onto a take-up reel BM.

Preferably, the coupling unit is provided with a further cooled calendar 16, placed between the gluing point and the winder 60.

As a function of the material of the layers of film S1, S1, the multilayer film M can be cooled, winding it partially on said calendar 16 before it is wound.

The invention has been described purely for illustrative and non-limiting purposes, according to some preferred embodiments. Those skilled in the art may find numerous other embodiments and variants, all falling within the scope of protection of the claims below.

The invention claimed is:

1. A method for producing a multilayer film including at least two layers joined by a two-component adhesive, the method comprising:
spreading a first liquid component of the two-component adhesive on a face of a first layer of the at least two layers of the film, the first liquid component being spread in a continuous and uniform layer;
spreading a second liquid component of the two-component adhesive on a face of a second layer of the at least two layers of the film, the second liquid component being spread in a continuous and uniform layer;
bringing the face of the first layer and the face of the second layer into mutual contact joining the first and second liquid components to form the two-component adhesive and join the two layers in the multilayer film; and
winding the obtained multilayer film,
wherein the spreading the first liquid component and the spreading the second liquid component of the two-component adhesive on the faces of the first and second layers comprises:
arranging at least a first metering roller and a second metering roller, mutually facing and spaced by a gap, at least the second metering roller being rotatable with respect to the first metering roller and being in contact with at least one of the first and second liquid components of the two-component adhesive,
arranging a regulation device to move at least the first metering roller with respect to the second metering roller, and
regulating the gap between the first metering roller and the second metering roller, to regulate the thickness of the respective liquid component of the two-component adhesive spread on the respective layer of film, as a function of one or more of geometric and dimensional parameters of the first metering roller, the regulating the gap comprising:
detecting an angular position of the first metering roller,
determining the one or more of the geometric and dimensional parameters of an operating zone of the first metering roller as a function of the angular position, and
activating the regulation device to move the first metering roller toward or away from the second metering roller, as a function of the one or more of the geometric and dimensional parameters.

2. The method according to claim 1, wherein the winding of the multilayer film is carried out directly after the step of bringing the two layers into contact.

3. The method according to claim 2, wherein the thickness of the layer of the two-component adhesive spread on the first layer of film and on the second layer of film is from 0.3 micron to 0.8 micron.

4. The method according to claim 2, wherein the ratio by weight between the first liquid component and the second liquid component is from 1.5:1 to 1:1.5.

5. The method according to claim 1, wherein the thickness of the layer of the two-component adhesive spread on the first layer of film and on the second layer of film is from 0.3 micron to 0.8 micron.

6. The method according to claim 1, wherein the ratio by weight between the first liquid component and the second liquid component is from 1.5:1 to 1:1.5.

7. The method according to claim 1, further comprising:
detecting a temperature parameter correlated to a temperature of the metering rollers; and
activating the regulation device to move the first metering roller toward or away from the second metering roller, as a function of said temperature parameter.

8. The method according to claim 1, further comprising:
arranging a pair of counter-rotating rollers, of which at least one of said counter-rotating rollers is a heatable calendar;
heating the outer surface of the calendar to a temperature from 57° C. to 63° C.;
conveying the two layers of film toward a gluing point between said counter-rotating rollers to bring the first and second liquid components of the two-component adhesive into contact.

9. The method according to claim 8, wherein, after the gluing point, the multilayer film is wound on the calendar on an arc of contact with an angle from 18° to 23°.

10. The method according to claim 8, wherein, before the gluing point, the first layer of film is wound on the calendar on an arc of contact with an angle from 68° to 78°.

11. The method according to claim 1, wherein, within 90 minutes from the joining of the two layers, the two-component adhesive has a bonding strength equal to or greater than 1.5 N/15 mm.

12. The method according to claim 1, wherein the material of the first layer of film and the material of the second layer of film is selected from the group consisting of paper, polymers or metal coated polymers, metal sheets, and nonwoven fabric.

13. The method according to claim 1, further comprising cooling the multilayer film,
   wherein the winding of the multilayer film is carried out after the cooling of the multilayer film.

14. The method according to claim 1, wherein the first liquid component is spread across the face of the first layer, and the second liquid component is spread across the face of the second layer.

15. The method according to claim 1, wherein the spreading the first liquid component, the spreading the second liquid component, the bringing the face of the first layer and the face of the second layer into mutual contact, and the winding are carried out without an external energy device configured to provide energy to cause mixing of the first liquid component and the second liquid component.

* * * * *